US011329301B2

(12) United States Patent
 Takahashi

(10) Patent No.: US 11,329,301 B2
(45) Date of Patent: May 10, 2022

(54) FUEL CELL SYSTEM

(71) Applicant: TOYOTA JIDOSHA KABUSHIKI KAISHA, Toyota (JP)

(72) Inventor: Yasushi Takahashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/099,859

(22) Filed: Nov. 17, 2020

(65) Prior Publication Data

US 2021/0226238 A1 Jul. 22, 2021

(30) Foreign Application Priority Data

Jan. 16, 2020 (JP) .............................. JP2020-005204

(51) Int. Cl.
 *H01M 8/04* (2016.01)
 *H01M 8/04746* (2016.01)
 *H01M 8/04119* (2016.01)
 *H01M 8/0438* (2016.01)
 *H01M 8/0662* (2016.01)
 *H01M 8/04828* (2016.01)

(52) U.S. Cl.
 CPC ... *H01M 8/04753* (2013.01); *H01M 8/04141* (2013.01); *H01M 8/04395* (2013.01); *H01M 8/04828* (2013.01); *H01M 8/0662* (2013.01)

(58) Field of Classification Search
 CPC ......... H01M 8/04753; H01M 8/04141; H01M 8/04395; H01M 8/04828
 See application file for complete search history.

(56) References Cited

U.S. PATENT DOCUMENTS

2002/0146606 A1* 10/2002 Kobayashi ........ H01M 8/04335
 429/436
2019/0081340 A1* 3/2019 Chikugo ........... H01M 8/04753

FOREIGN PATENT DOCUMENTS

JP 2009123550 A 6/2009
JP 2010177123 A 8/2010

* cited by examiner

*Primary Examiner* — Olatunji A Godo
(74) *Attorney, Agent, or Firm* — Dickinson Wright, PLLC

(57) ABSTRACT

To precisely measure and control the amount of a cathode gas supplied to a fuel cell, a fuel cell system includes a fuel cell, a first flow passage through which a cathode gas is supplied to the fuel cell, a second flow passage through which a cathode off-gas is discharged from the fuel cell, a bypass flow passage which is bifurcated from the first flow passage and which is connected to the second flow passage, a compressor provided in the first flow passage, a first flowmeter provided in the first flow passage, a flow amount regulation valve provided in the bypass flow passage, a second flowmeter provided in the bypass flow passage, and a controller which controls the flow amount of the cathode gas supplied to the fuel cell, wherein the compressor is arranged on the upstream side of the bypass flow passage, the first flowmeter is arranged on the upstream side of the compressor, the second flowmeter is arranged on the downstream side of the flow amount regulation valve, and the controller controls the flow amount of the cathode gas supplied to the fuel cell based on the flow amount measured by the first flowmeter and the flow amount measured by the second flowmeter.

6 Claims, 2 Drawing Sheets

FUEL CELL SYSTEM

FIELD

The present application discloses a fuel cell system.

BACKGROUND

In order to enhance power generation performance of a fuel cell, it is desirable to supply a necessary and sufficient amount of cathode gas and anode gas to the fuel cell. To this end, it is necessary to precisely detect the flow amount of each of the cathode gas and the anode gas supplied to the fuel cell. For example, as disclosed in Patent Literature 1, a flowmeter may be provided at a cathode gas supply port of the fuel cell to measure the flow amount of the cathode gas supplied to the fuel cell.

Note that as disclosed in Patent Literature 1 and 2, when a cathode gas is supplied to the fuel cell, the pressure of the cathode gas may be increased by a compressor.

CITATION LIST

Patent Literature

[PTL 1] Japanese Unexamined Patent Publication No. 2010-177123
[PTL 2] Japanese Unexamined Patent Publication No. 2009-123550

SUMMARY

Technical Problem

In fuel cells, there are cases where the flow amount of cathode gas is increased and the gas pressure is increased in high load operations, such as demands for a high output or high temperature operations. In this case, in a transition stage, the temperature and pressure of the gas in a cathode gas passage change greatly. Furthermore, there are cases where the flow amount of the cathode gas supplied to the fuel cell is reduced by distribution control. In this case, the gas pressure in the cathode gas passage tends to fluctuate. For instance, depending on the operation state of the fuel cell, in the vicinity of a cathode gas supply port of the fuel cell, the gas temperature and gas pressure may change from the ambient temperature to 100° C. and from the atmospheric pressure to 3 atm within one second, respectively.

In common gas flowmeters, the gas flow amount is measured while correcting using numerical values obtained by a pressure sensor and/or a temperature sensor. Such gas flowmeters are intended for use in environments in which no sudden temperature or pressure changes take place, and accordingly, have a poor response to sudden temperature or pressure changes. Therefore, in the aforementioned environments in which the temperature or pressure suddenly changes, it is impossible to highly responsively correct the gas flowmeter, thus leading to deterioration of the measurement precision of the gas flowmeter, and as a result, there is a risk that the gas flow amount supplied to the fuel cell cannot be accurately measured.

Solution to Problem

The present application discloses, as one of means for solving the aforementioned problems,
a fuel cell system comprising:
a fuel cell,
a first flow passage through which a cathode gas is supplied to the fuel cell,
a second flow passage through which a cathode off-gas is discharged from the fuel cell,
a bypass flow passage which is branched from the first flow passage and which is connected to the second flow passage,
a compressor provided in the first flow passage,
a first flowmeter provided in the first flow passage,
a flow amount regulation valve provided in the bypass flow passage,
a second flowmeter provided in the bypass flow passage, and
a controller which controls the flow amount of the cathode gas supplied to the fuel cell, wherein
the compressor is arranged on the upstream side from the bypass flow passage,
the first flowmeter is arranged on the upstream side from the compressor,
the second flowmeter is arranged on the downstream side from the flow amount regulation valve, and
the controller controls the flow amount of the cathode gas supplied to the fuel cell based on the flow amount measured by the first flowmeter and the flow amount measured by the second flowmeter.

In the fuel cell system of the present disclosure, the first flow passage may be provided with a humidifier, wherein the humidifier may be arranged between the fuel cell and the bypass flow passage and may humidify the inside of the fuel cell using water in a cathode off-gas discharged from the fuel cell into the second flow passage.

In the fuel cell system of the present disclosure, a cleaner may be provided in the first flow passage, wherein the cleaner may be arranged on the upstream side from the compressor.

In the fuel cell system of the present disclosure, the cleaner may be provided with the first flowmeter.

Advantageous Effects

In the fuel cell system of the present disclosure, even if the gas temperature or pressure in the cathode gas flow passage greatly fluctuates, it is possible to precisely measure and control the flow amount of the cathode gas supplied to the fuel cell by the use of, for example, a conventional gas flowmeter.

DESCRIPTION OF EMBODIMENTS

1. Fuel Cell System

Figure 1:
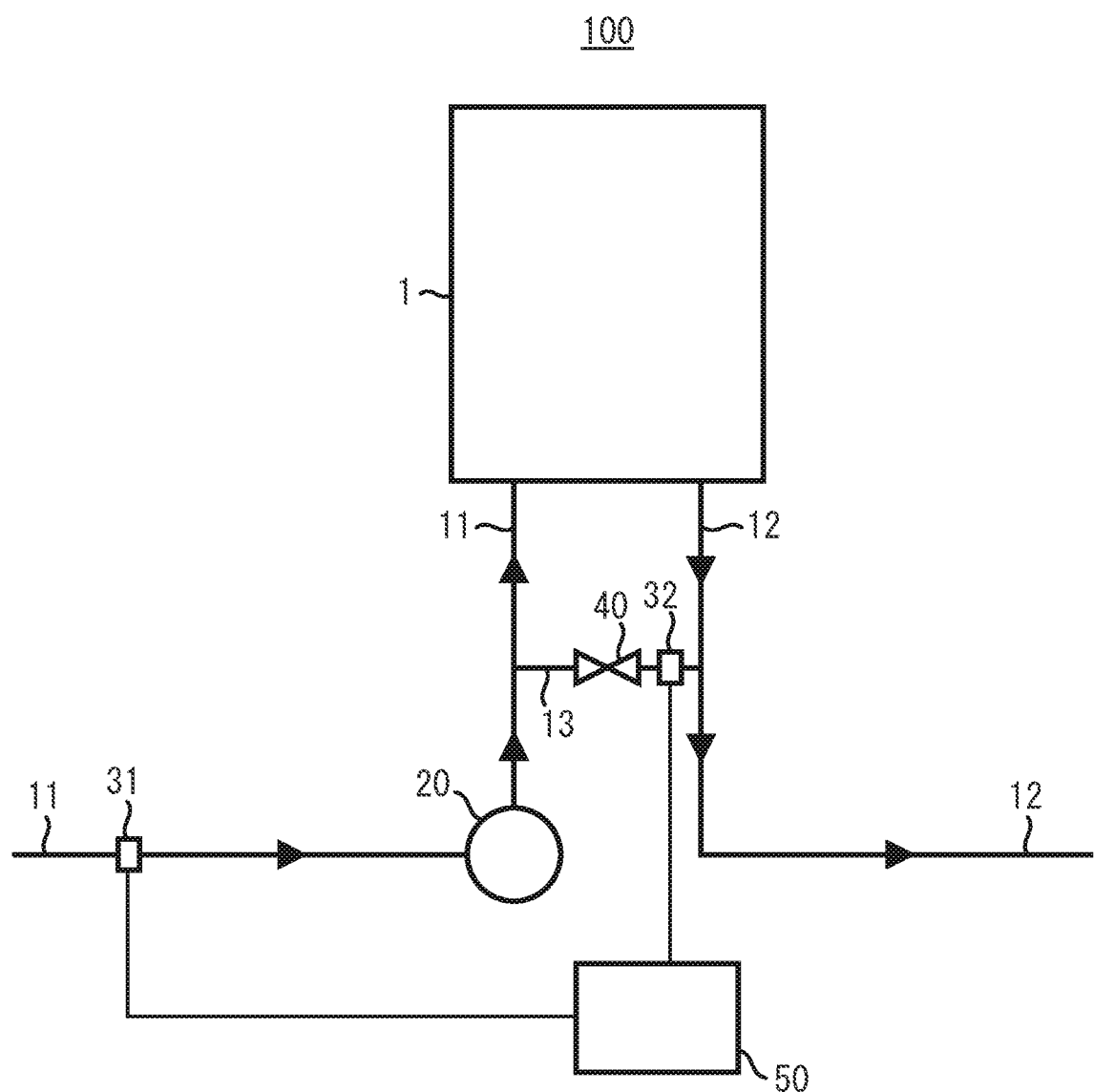
FIG. 1 is an explanatory schematic view showing the structure of a fuel cell system 100.

FIG. 1 schematically illustrates the structure of the fuel cell system 100. As shown in FIG. 1, the fuel cell system 100 comprises:
a fuel cell 1,
a first flow passage 11 through which a cathode gas is supplied to the fuel cell 1,
a second flow passage 12 through which a cathode off-gas is discharged from the fuel cell 1, a bypass flow passage 13 which is branched from the first flow passage 11 and which is connected to the second flow passage 12, a compressor 20 provided in the first flow passage 11, a first flowmeter 31 provided in the first flow passage 11, a flow amount regulation valve 40 provided in the bypass flow passage 13, a second flowmeter 32 provided in the bypass flow passage 13, and a controller 50 which controls the flow amount of the cathode gas supplied to the fuel cell 1.

The compressor 20 is arranged on the upstream side from the bypass flow passage 13.

The first flowmeter 31 is arranged on the upstream side from the compressor 20.

The second flowmeter 32 is arranged on the downstream side from the flow amount regulation valve 40.

The controller 50 controls the flow amount of the cathode gas supplied to the fuel cell 1 based on the flow amount measured by the first flowmeter 31 and the flow amount measured by the second flowmeter 32.

1.1 Fuel Cell

The fuel cell 1 is supplied with cathode gas and anode gas to generate electricity. The cathode gas may be an oxygen-containing gas, such as air. The anode gas may be hydrogen or may be a fuel gas other than hydrogen. By way of example, the fuel cell 1 may be a polymer electrolyte fuel cell (PEFC). The fuel cell 1 may be a fuel cell stack. The connection method of the fuel cell 1 and the flow passages, which will be discussed hereinafter, is not limited to a specific method. For example, connection using conventional piping systems may be used.

1.2 First Flow Passage

The first flow passage 11 defines a passage through which the cathode gas is supplied to the fuel cell 1. For instance, one end of the first flow passage 11 on the upstream side may be connected to a cathode gas source, and the other end on the downstream side may be connected to a cathode gas supply port of the fuel cell 1. The form of the cathode gas supply source is not particularly limited. If air is used as the cathode gas, the upstream end of the first flow passage 11 may open into the atmosphere.

1.3 Second Flow Passage

The second flow passage 12 defines a passage through which a cathode off-gas is discharged from the fuel cell 1. For example, one end of the second flow passage 12 on the upstream side may be connected to a cathode off-gas discharge port of the fuel cell 1, and the other end on the downstream side may open into the atmosphere. The cathode off-gas contains a gas generated by cell reaction in the cathode of the fuel cell 1. The cathode off-gas may contain, for example, oxygen or water.

1.4 Bypass Passage

The bypass passage 13 is branched from the first flow passage 11 and is connected to the second flow passage 12. The bypass passage 13 may function as a discharge passage through which, for example, when the amount or pressure of the cathode gas in the first flow passage 11 is excessive, the excessive cathode gas is discharged from the first flow passage 11 into the second flow passage 12. Furthermore, when a compressor 20, which will be discussed hereinafter, is a turbo compressor (e.g., a centrifugal compressor), the bypass passage 13 may also have a function to avoid surging of the turbo compressor. In other words, when the amount of the cathode gas required by the fuel cell 1 is below the lower limit amount of the turbo compressor, it is possible to maintain the amount of cathode gas of the turbo compressor above the lower limit amount using the bypass passage 13, in order to avoid the occurrence of surging. It is also possible to control the amount of cathode gas supplied to the fuel cell 1 by bifurcating a part of the cathode gas into the bypass passage 13. In addition, the bypass passage 13 can function as a passage through which the cathode gas is discharged when it is necessary to restrict or interrupt the supply of the cathode gas to the fuel cell 1 for some reason.

1.5 Compressor

A compressor 20 is provided in the first flow passage 11. The compressor 20 is arranged on the upstream side from the bypass passage 13. The compressor 20 has a function to increase the pressure of the cathode gas supplied to the fuel cell 1. The type of the compressor is not particularly limited. The compressor 20 may be of, for example, a turbo, scroll, or helical-roots type. Whatever type of the compressor 20 is used, the aforementioned temperature fluctuation or pressure fluctuation takes place in the first flow passage 11 on the downstream side from the compressor 20.

1.6 First Flowmeter

A first flowmeter 31 is provided in the first flow passage 11. The first flowmeter 31 is arranged on the upstream side from the compressor 20. The upstream side from the compressor 20 is not likely to be affected by the aforementioned temperature fluctuation or pressure fluctuation on the downstream side from the compressor 20. Therefore, the amount of the cathode gas flowing into the compressor 20 in the first flow passage 11 can be precisely measured by the first flowmeter 31. The measurement method of the first flowmeter 31 is not particularly limited. For example, a thermal flowmeter may be used. In the fuel cell system 100 of the present disclosure, it is not necessary to use an expensive dedicated meter as the first flowmeter 31 and instead, inexpensive general-purpose meters may be used.

1.7 Flow Amount Regulation Valve

A flow amount regulation valve 40 is provided in the bypass flow passage 13. As stated above, there are cases where a part of the cathode gas is bifurcated from the first flow passage 11 into the bypass flow passage 13 depending on the operation state of the fuel cell 1 or the like. In this case, it is possible to regulate the flow amount of the cathode gas bifurcated into the bypass flow passage 13 by adjusting the opening degree of the flow amount regulation valve 40. The flow amount regulation valve 40 may be of any type as long as the flow amount of the cathode gas in the bypass passage 13 can be increased or decreased and is not limited to a specific type of valve.

1.8 Second Flowmeter

A second flowmeter 32 is provided in the bypass flow passage 13. The second flowmeter 32 is arranged on the downstream side from the flow amount regulation valve 40. The downstream side from the flow amount regulation valve 40 is not likely to be affected by the aforementioned temperature fluctuation or pressure fluctuation in the first flow passage 11. For example, on the downstream side from the flow amount regulation valve 40, not the cathode gas which has been compressed by the compressor 20 and which has a large pressure and/or temperature fluctuation, but rather the cathode gas the temperature and pressure of which are approximate to the ambient temperature and atmospheric pressure flows. As a result, the amount of the cathode gas flowing into the bypass flow passage 13 can be precisely measured by the second flowmeter 32. The measurement method of the second flowmeter 32 is not particularly limited. For example, a thermal flowmeter may be used. In the fuel cell system 100 of the present disclosure, it is not necessary to use an expensive dedicated meter as the second flowmeter 32 and instead, inexpensive general-purpose meters may be used.

1.9 Controller

The controller 50 controls the amount of cathode gas supplied to the fuel cell 1 based on the flow amount measured by the first flowmeter 31 and the flow amount measured by the second flowmeter 32. The controller 50 may be configured in the same manner as conventional control means. In other words, the controller 50 may comprise a CPU, RAM and ROM, etc.

As stated above, in the fuel cell system 100, the amount of the cathode gas (flow amount X) flowing into the compressor 20 is precisely measured by the first flowmeter 31. The amount of the cathode gas flowing into the compressor 20 is substantially identical to the amount of the cathode gas flowing from the compressor 20 toward the downstream side thereof. Alternatively, in consideration of the performance of the compressor 20, the amount of the cathode gas flowing from the compressor 20 toward the downstream side thereof can be easily determined from the amount of the cathode gas flowing into the compressor 20. Furthermore, in the fuel cell system 100, the amount of the cathode gas (flow amount Y) which is bifurcated from the compressor 20 into the bypass flow passage 13 without flowing into the fuel cell 1 can be precisely measured by the second flowmeter 32. In the fuel cell system 100 illustrated in FIG. 1, as will be obvious from the structure thereof, for example, the flow amount (X−Y) corresponding to the difference between the flow amount X and the flow amount Y is substantially equal to the amount of the cathode gas supplied to the fuel cell 1.

Therefore, the controller 50 may obtain an estimated value of the flow amount of the cathode gas supplied to the fuel cell 1 from the difference between the flow amount X and the flow amount Y and may control the amount of the cathode gas supplied to the fuel cell 1 based on the estimated value. Specifically, for example, if the estimated value of the flow amount of the cathode gas is below the flow amount of the cathode gas necessary for the fuel cell 1, the amount of the cathode gas of the compressor 20 may be increased or the opening degree of the flow amount regulation valve 40 is decreased in accordance with a signal from the controller 50, to thereby increase the amount of the cathode gas supplied to the fuel cell 1 to the necessary value. Further, if the estimated value of the flow amount of the cathode gas is over the flow amount of the cathode gas necessary for the fuel cell 1, the amount of the cathode gas of the compressor 20 may be decreased or the opening degree of the flow amount regulation valve 40 is increased in accordance with a signal from the controller 50, to thereby decrease the amount of the cathode gas supplied to the fuel cell 1 to the necessary value.

Alternatively, as will be stated hereinafter, the opening degrees of the valves 81, 82 and 83 optionally provided in the first flow passage 11 or the second flow passage 12 may be controlled by the controller 50 to control the amount of the cathode gas supplied to the fuel cell 1.

1.10 Other Constituent Components

The fuel cell system 100 may comprise the following structures in addition to the aforementioned structures.

1.10.1 Humidifier

Figure 2:
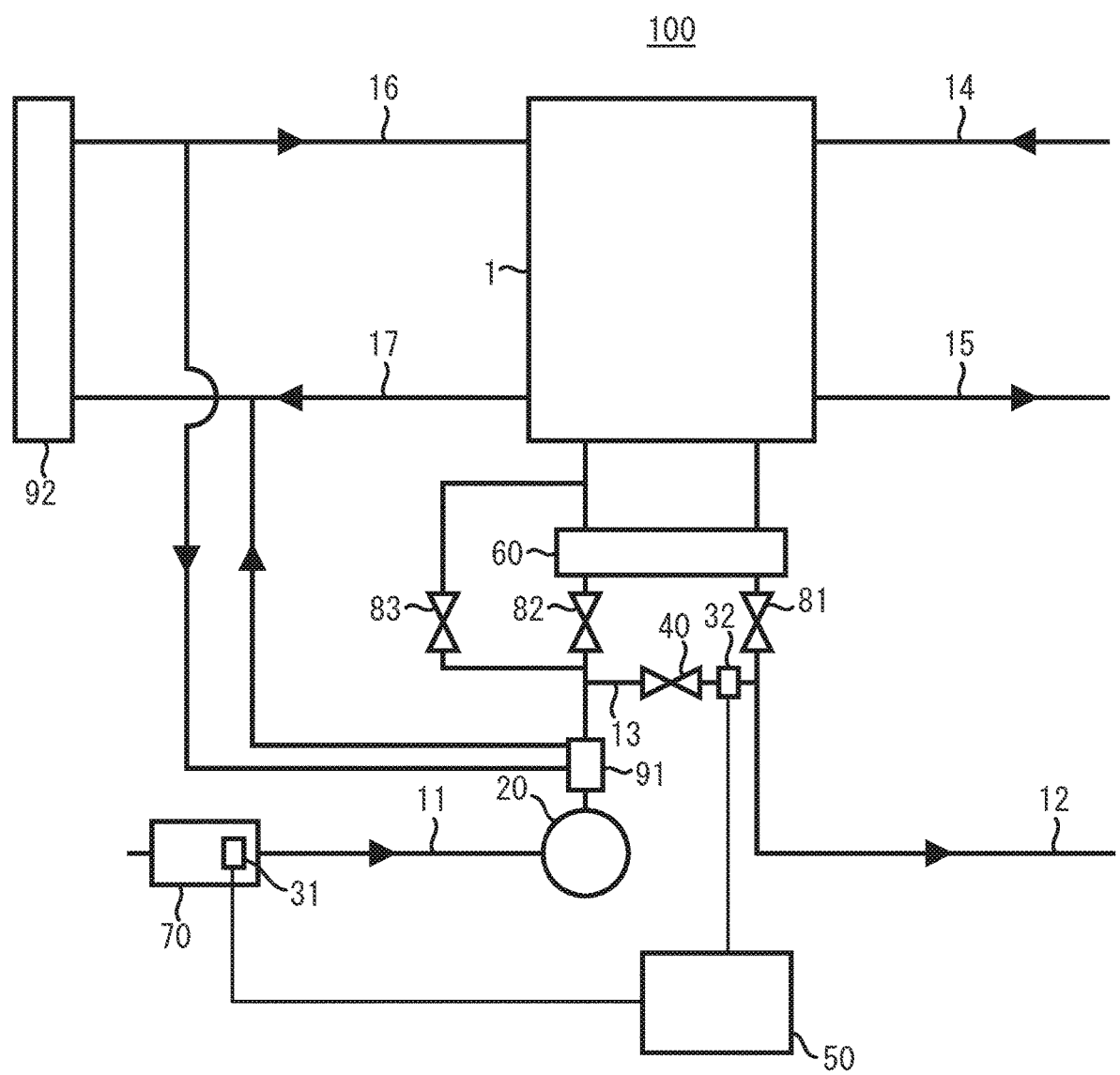
FIG. 2 is an explanatory schematic view showing an example of other constituent components of the fuel cell system 100.

As shown in FIG. 2, in the fuel cell system 100, a humidifier 60 may be provided in the first flow passage 11. The humidifier 60 may be arranged between the fuel cell 1 and the bypass passage 13. Furthermore, as shown in FIG. 2, the humidifier 60 may be connected to both the first flow passage 11 and the second flow passage 12. Specifically, the humidifier 60 may humidify the inside of the fuel cell 1 using the water contained in the cathode off-gas discharged into the second flow passage 12 from the fuel cell 1. In other words, in the fuel cell system 100, the water may be circulated through the fuel cell 1, the first flow passage 11, the second flow passage 12, and the humidifier 60.

When the fuel cell system comprises the humidifier, the vicinity of the cathode gas supply port of the fuel cell in which the temperature and/or pressure greatly changes becomes a highly humid environment. In such harsh environments, there is a risk that the measurement accuracy of the amount of cathode gas by the flowmeter is further deteriorated. In contrast thereto, in the fuel cell system 100 of the present disclosure, since the first flowmeter 31 is provided on the upstream side of the humidifier 60 and the second flowmeter 32 is provided in the bypass flow passage 13, which is substantially free from the influence of the humidification with the humidifier 60, the first flowmeter 31 and the second flowmeter 32 are unlikely to be influenced by the humidity of the humidifier 60. In other words, if the fuel cell system 100 is provided with the humidifier 60, the cathode gas amount supplied to the fuel cell 1 can be precisely measured and estimated based on the measurements of the first flowmeter 31 and the second flowmeter 32.

1.10.2 Cleaner

As shown in FIG. 2, in the fuel cell system 100, a cleaner 70 may be provided in the first flow passage 11. The cleaner 70 may be arranged on the upstream side from the compressor 20. As stated above, if air is flowed as the cathode gas in the first flow passage 11, the upstream end of the first flow passage 11 may open into the atmosphere to take in air in the atmosphere. In this case, the cleaner 70 may be provided on the upstream side of the compressor 20 so as to remove dust or foreign matter in the air. The cleaner 70 may comprise, for example, a housing and a filter arranged in the housing.

In the inside of the cleaner 70, at least partially, the flow amount of the cathode gas tends to be constant, and accordingly, the amount of the cathode gas can be precisely measured. In connection thereto, in the fuel cell system 100, as shown in FIG. 2, the cleaner 70 may be provided with the first flowmeter 31.

1.10.3 Valve

The first flow passage 11 and the second flow passage 12 may be provided with valves. For example, as shown in FIG. 2, the second flow passage 12 may be provided with a valve 81 on the upstream side from the bypass flow passage 13 (between the fuel cell 1 and the bypass flow passage 13). It is possible to control the flow amount or pressure of the cathode gas by controlling the opening degree of the valve 81. For example, if the internal pressure of the fuel cell 1 decreases, the opening degree of the valve 81 may be decreased and the internal pressure of the first flow passage 11 may be increased by the compressor 20.

As shown in FIG. 2, a valve 82 may be provided in the first flow passage 11 on the downstream side from the bypass flow passage 13 (between the fuel cell 1 and the bypass flow passage 13). The amount and pressure of the cathode gas can be controlled by controlling the opening degree of the valve 82. For example, if the amount of the cathode gas supplied to the fuel cell 1 exceeds the necessary amount, the opening degree of the valve 82 may be decreased and the opening degree of the flow amount regulation valve 40 may be increased, so that the amount of the cathode gas supplied to the fuel cell 1 may be reduced without changing the amount of the cathode gas of the compressor 20.

As shown in FIG. 2, if the humidifier 60 is provided in the fuel cell system 100, the first flow passage 11 may be provided with a bypass passage bypassing the humidifier 60, and the bypass passage may be provided with a valve 83. In this case, as shown in FIG. 2, the valve 82 may be provided on the upstream side from the humidifier 60 (i.e., between the bypass passage and the humidifier 60). In other words, as shown in FIG. 2, when the inside of the fuel cell 1 should be humidified by the humidifier 60, the opening degree of the valve 82 may be increased and the opening degree of the valve 83 may be decreased. When the humidification by the humidifier 60 is not necessary, the opening degree of the valve 82 may be decreased and the opening degree of the valve 83 may be increased. Note that in the fuel cell system 100, the opening and closing operations of the valves 81 and 82 may be controlled by the aforementioned controller 50. Namely, it is sufficient that the controller 50 control at least the amount of the cathode gas supplied to the fuel cell 1. Alternatively, the controller 50 may control the humidity of the fuel cell 1 and may further perform control over conditions other than the humidity, in addition to the supply amount of the cathode gas.

1.10.4 Intercooler

As shown in FIG. 2, in the fuel cell system 100, an intercooler 91 may be provided on the downstream side from the compressor 20. In other words, the cathode gas, the temperature of which has increased due to an increase in pressure by the compressor 20, may be cooled by the intercooler 91 while maintaining a predetermined pressure. The intercooler 91 may be connected, for example, to coolant passages 16 and 17, which will be discussed hereinafter. In other words, a part of the coolant which circulates in the coolant passages 16 and 17 is branched into the intercooler 91, whereby the necessary coolability of the intercooler 91 can be easily obtained.

1.10.5 Others

As shown in FIG. 2, in the fuel cell system 100, a flow passage 14 through which the anode gas is supplied to the fuel cell 1 and a flow passage 15 through which the anode off-gas is discharged from the fuel cell 1 may be provided. The anode off-gas flow passage 15 may be connected to the second flow passage 12, which defines the cathode off-gas passage. Furthermore, as shown in FIG. 2, in the fuel cell system 100, the coolant passages 16 and 17 may be provided for the circulation of coolant between the fuel cell 1 and the heat exchanger 92. The anode side flow passages 14 and 15 and the coolant passages 16 and 17 may be configured in the same manner as the prior art.

The fuel cell system 100 may comprise other constituent components which are not illustrated. For example, the fuel cell system 100 may comprise gas-liquid separators which separate gases and liquids of the anode off-gas and the cathode off-gas. Needless to say, wiring, etc., extending from the fuel cell 1 to the outside may be provided, which may be configured in the same manner as the prior art.

Note that, each of the constituent components illustrated in FIG. 2 is merely an example of a component which can be provided in the fuel cell system 100 of the present disclosure. The fuel cell system 100 of the present disclosure has the basic structure shown in FIG. 1 and may comprise only a part of the constituent elements or constituent elements other than those shown in FIG. 2.

2. Measuring Method of the Flow Amount of Cathode Gas

The technology of the present disclosure also includes an aspect of a measuring method of the amount of the cathode gas supplied to the fuel cell. In other words, as shown in FIG. 1, the measuring method of the amount of the cathode gas of the present disclosure is a method for measuring the amount of a cathode gas supplied to the fuel cell 1 in the fuel cell system 100 which comprises the fuel cell 1, the first flow passage 11 through which the cathode gas is supplied to the fuel cell 1, the second flow passage 12 through which the cathode off-gas is discharged from the fuel cell 1, the bypass flow passage 13 which is branched from the first flow passage 11 and connected to the second flow passage 12, the compressor 20 which is provided in the first flow passage 11, the first flowmeter 31 provided in the first flow passage 11, the flow amount regulation valve 40 which is provided in the bypass flow passage 13, and the second flowmeter 32 which is provided in the bypass flow passage 13, wherein the compressor 20 is arranged on the upstream side from the bypass flow passage 13, wherein the measuring method is characterized by arranging the first flowmeter 11 on the upstream side from the compressor 20, arranging the second flowmeter 12 on the downstream side from the flow amount regulation valve 40, and measuring the amount of the cathode gas supplied to the fuel cell 1 based on the flow amount measured by the first flowmeter 11 and the flow amount measured by the second flowmeter 12. Each of the constituent components is as described above, and detailed explanations thereof have been omitted.

3. Vehicle

The fuel cell system of the present disclosure can be adopted as, for example, a power source of vehicles. When the fuel cell system of the present disclosure is mounted on a vehicle, it is practically difficult to linearly arrange the entirety of the first flow passage 11 due to restrictions on arrangement, and accordingly, it may be necessary to bend the first flow passage 11 at a plurality of positions. In this case, in the bent portions of the first flow passage 11, the flow rate of the cathode gas has a distribution, thus resulting in slight reduction of the measurement precision of the amount of the cathode gas. In other words, in order to more precisely measure the amount of the cathode gas, the first flowmeter 31 may be arranged in the straight portion of the first flow passage 11. Alternatively, if it is impossible to secure a sufficient length of straight portion of the first flow passage 11, the first flowmeter 31 may be provided in the cleaner 91, as stated above.

As can be seen from the foregoing, according to the fuel cell system 100 of the present disclosure, when the temperature and/or pressure of the cathode gas in the first flow passage 11 suddenly changes due to an increase in pressure by the compressor 20 or the like, the amount of the cathode gas supplied to the fuel cell 1 can be precisely measured and controlled based on the measurements of the first flowmeter 31 and the second flowmeter 32. Furthermore, when a part of the cathode gas is bifurcated into the bypass flow passage 13, such as when a distribution control is performed through the bypass flow passage 13 to avoid surging of the compressor 20, which is, for example, a turbo-compressor, the amount of the cathode gas supplied to the fuel cell 1 can be precisely measured and controlled.

REFERENCE SIGNS LIST

1 Fuel cell
11 First flow passage
12 Second flow passage
13 Bypass flow passage
14 Anode gas supply passage
15 Anode off-gas discharge passage
16 Coolant supply passage
17 Coolant return passage 20 Compressor
31 First flowmeter
32 Second flowmeter
40 Flow amount regulation valve
50 Controller
60 Humidifier
70 Cleaner
81, 82, 83 Valve
91 Intercooler
92 Heat exchanger
100 Fuel cell system

The invention claimed is:

1. A fuel cell system comprising:
a fuel cell,
a first flow passage through which a cathode gas is supplied to the fuel cell,
a second flow passage through which a cathode off-gas is discharged from the fuel cell,
a bypass flow passage which is branched from the first flow passage and which is connected to the second flow passage,
a compressor provided in the first flow passage,
a first flowmeter provided in the first flow passage,
a flow amount regulation valve provided in the bypass flow passage,
a second flowmeter provided in the bypass flow passage, and
a controller which controls the flow amount of the cathode gas supplied to the fuel cell, wherein
the compressor is arranged on the upstream side from the bypass flow passage,
the first flowmeter is arranged on the upstream side from the compressor,
the second flowmeter is arranged on the downstream side from the flow amount regulation valve, and
the controller controls the flow amount of the cathode gas supplied to the fuel cell based on the flow amount measured by the first flowmeter and the flow amount measured by the second flowmeter.

2. The fuel cell system according to claim 1, wherein
the first flow passage is provided with a humidifier,
the humidifier is arranged between the fuel cell and the bypass flow passage, and
the humidifier humidifies the inside of the fuel cell using water in a cathode off-gas discharged from the fuel cell into the second flow passage.

3. The fuel cell system according to claim 1, comprising a cleaner provided in the first flow passage, wherein the cleaner is arranged on the upstream side from the compressor.

4. The fuel cell system according to claim 3, wherein the cleaner is provided with the first flowmeter.

5. The fuel cell system according to claim 2, comprising a cleaner provided in the first flow passage, wherein the cleaner is arranged on the upstream side from the compressor.

6. The fuel cell system according to claim 5, wherein the cleaner is provided with the first flowmeter.

* * * * *